(12) United States Patent
Gravino

(10) Patent No.: US 8,464,821 B2
(45) Date of Patent: Jun. 18, 2013

(54) REGENERATIVE BRAKING SYSTEM

(76) Inventor: Marc Charles Gravino, Rockford, IL (US)

( * ) Notice: Subject to any disclaimer, the term of this patent is extended or adjusted under 35 U.S.C. 154(b) by 191 days.

(21) Appl. No.: 13/024,742

(22) Filed: Feb. 10, 2011

(65) Prior Publication Data

US 2011/0198143 A1 Aug. 18, 2011

Related U.S. Application Data

(60) Provisional application No. 61/304,089, filed on Feb. 12, 2010.

(51) Int. Cl.
*B60K 6/00* (2007.10)

(52) U.S. Cl.
USPC ............................ 180/165; 180/370; 180/325

(58) Field of Classification Search
USPC ................ 180/165, 370, 65.23, 65.31, 65.25, 180/156, 158, 166, 168, 325
See application file for complete search history.

(56) References Cited

U.S. PATENT DOCUMENTS

| | | | |
|---|---|---|---|
| 2,137,574 A | 1/1938 | Kromer | |
| 3,530,356 A * | 9/1970 | Aronson | 180/65.31 |
| 4,246,988 A | 1/1981 | Hoppie | |
| 4,300,088 A * | 11/1981 | Hicks | 322/80 |
| 4,305,489 A | 12/1981 | Hoppie | |
| 4,310,079 A | 1/1982 | Hoppie | |
| 4,319,655 A * | 3/1982 | Hoppie | 180/165 |
| 4,333,553 A | 6/1982 | Hoppie et al. | |
| 4,477,764 A * | 10/1984 | Pollard | 320/116 |
| 4,479,356 A | 10/1984 | Gill | |
| 4,531,719 A | 7/1985 | Hoppie et al. | |
| 4,532,163 A | 7/1985 | Hoppie | |
| 4,591,016 A * | 5/1986 | Matthews | 180/165 |
| 4,813,509 A | 3/1989 | Harris | |
| 5,125,469 A * | 6/1992 | Scott | 180/65.25 |
| 5,655,617 A | 8/1997 | Marshall | |
| 5,707,115 A * | 1/1998 | Bodie et al. | 180/165 |
| 7,104,347 B2 * | 9/2006 | Severinsky et al. | 180/65.23 |
| 8,028,788 B2 * | 10/2011 | Stilwell et al. | 180/370 |
| 2002/0179047 A1 * | 12/2002 | Hoang et al. | 123/350 |
| 2004/0147364 A1 * | 7/2004 | Wakashiro et al. | 477/3 |
| 2007/0207889 A1 | 9/2007 | Costello | |

FOREIGN PATENT DOCUMENTS

| | | |
|---|---|---|
| JP | 05-238285 A | 9/1993 |
| JP | 2003-182399 A | 7/2003 |
| KR | 10-0189569 B1 | 6/1999 |
| KR | 20-0144458 Y1 | 6/1999 |

* cited by examiner

*Primary Examiner* — Hau Phan
(74) *Attorney, Agent, or Firm* — Reinhart Boerner Van Deuren P.C.

(57) ABSTRACT

A regenerative braking system is provided. The regenerative braking system includes at least one energy storage medium operably connected to a coupler. The coupler is operable to selectively couple and decouple the energy storage medium with a drive train of motor vehicle, or an electric generator, or a combination of both. A control arrangement governs the operation of the coupler. A sensor of the control arrangement is operable to determine information relating to the relative deceleration and acceleration of the motor vehicle and send said information to the controller. The controller is operable to determine the amount of energy storage medium or mediums to be coupled to the drive train via the coupler.

19 Claims, 6 Drawing Sheets

REGENERATIVE BRAKING SYSTEM

CROSS-REFERENCE TO RELATED PATENT APPLICATIONS

This patent application claims the benefit of U.S. Provisional Patent Application No. 61/304,089 filed Feb. 12, 2010, the entire teachings and disclosures of which are incorporated herein by reference thereto.

FIELD OF THE INVENTION

This present invention generally relates to an energy storage device for a vehicle, and more particularly to a regenerative braking system.

BACKGROUND OF THE INVENTION

In view of recent events, fuel economy for automotive vehicles has become of great importance. The rising cost of fuel and other considerations have driven manufactures of automotive vehicles to consider alternative fuel sources and systems such as hydrogen, solar power, fuel cells, hybrid gas/electric, and natural gas. Additionally, many hybrid vehicles combining various power transmission techniques have also been introduced to the market in recent years.

A vehicle that utilizes an alternative fuel source provides the advantage of avoiding the economic strain of the ever increasing cost of fossil fuel. However, this advantage does not come without an associated cost. For example, to realize the advantages of a vehicle that utilizes an alternative fuel source, a new alternative fuel source vehicle must be purchased or an existing fossil fuel type vehicle must be retrofitted to incorporate the alternative fuel source. Each of these alternatives requires a relatively high cost to effectuate.

Like all mechanical systems, a conventional internal combustion engine converts one form of energy (the combustion of air and fuel) to another form of energy (kinetic energy in the form of the rotation of the driveshaft of a vehicle). However, this conversion of energy is not without losses. For example, once the energy from the combustion of air and fuel has been converted to kinetic rotational energy in the driveshaft to propel the vehicle, an equivalent amount of energy is required to stop the vehicle. Stopping the vehicle is ordinarily accomplished with a conventional frictional braking system. A frictional braking system stops the vehicle by converting the kinetic energy of the vehicle in motion primarily into heat energy generated by the friction between the friction pad of the brakes and a rotor or a disc operatively connected to a wheel of the car. Once the kinetic energy of the car is converted to heat energy, the heat energy is absorbed by the vehicle itself and otherwise dissipated into the atmosphere. Once the heat energy is absorbed by the vehicle and dissipated into the atmosphere, it cannot be recaptured thereafter.

Given the above noted increasing costs of fuel, and that fossil fuel resources are considered to be limited, non-replenishable, and polluting, attempts have been made to utilize less fuel by recapturing the energy otherwise lost by a conventional frictional braking system using a regenerative braking system. Current regenerative braking systems typically incorporate a relatively complex system to recapture the energy otherwise lost during the braking of the vehicle. For example, some regenerative braking systems utilize a hydraulic system that incorporates a high pressure accumulator to recapture the energy otherwise lost during braking. Other systems incorporate the use of a fly wheel and complex belt and pulley system.

Unfortunately, the above-noted regenerative braking systems are relatively complex, add a significant amount of weight to the vehicle thereby reducing the overall fuel economy of the vehicle, and have reliability issues as a function of their complexity. Moreover, typical electrical regenerative braking systems utilize a complex series of generator motors and switches that rapidly switch on and off a charging cycle for a battery, resulting in a reduced life cycle of the battery itself and the associated electronic componentry. This rapid switching of the charge cycle also results in an inefficient charge cycle.

It is therefore desirable to have a regenerative braking system that can be quickly adapted to an internal combustion type vehicle, hybrid vehicle, or electrically powered vehicle at a relatively low cost. It is further desirable that such a regenerative braking system be embodied in a simplified, low-weight package that eliminates the rapid on/off charge cycle, thereby maximizing the efficiency of the same.

The invention provides such a regenerative braking system. These and other advantages of the invention, as well as additional inventive features, will be apparent from the description of the invention provided herein.

BRIEF SUMMARY OF THE INVENTION

In certain embodiments, a regenerative braking apparatus for a motor vehicle is provided. A regenerative braking apparatus includes at least one spring configured for mechanical communication with a drive train of the motor vehicle. A coupler is configured to selectively couple and decouple the at least one spring with the drive train. A control arrangement including a controller and a sensor is also provided. The sensor is configured to sense an acceleration and a deceleration of the motor vehicle. The controller is operable to operate the coupler such that the at least one spring is compressed by the coupler when the sensor senses the deceleration and the at least one spring is decompressed when the sensor senses the acceleration.

In certain embodiments, the coupler moves in a first direction to compress the at least one spring and a second direction opposite the first direction when the at least one spring is decompressed. The coupler is mechanically coupled between the at least one spring and a drive shaft of the drive train such that movement of the coupler in the second direction results in rotation of the drive shaft by the coupler. In certain embodiments, the coupler is mechanically coupled between the at least one spring and the drive train and between an electric generator. Movement of the coupler in the second direction results in rotation of the electric generator to generate electricity and results in rotation of the drive shaft.

In certain embodiments, the at least one spring includes a plurality of springs independently compressible and decompressable from one another by the coupler. The control arrangement is operable to select predetermined ones of the plurality of springs to match a braking requirement. The coupler is also operable to simultaneously compress the predetermined ones of the plurality of springs. In certain embodiments, the control arrangement is operable to select a predetermined compressed ones of the plurality of springs based on an acceleration requirement. The coupler is operable to unlock the predetermined compressed ones of the plurality of springs to mechanically transfer energy to the drive shaft. In certain embodiments, the coupler is mechanically coupled between the plurality of springs and an electric generator. The coupler is operable to unlock the predetermined compressed ones of plurality of springs to rotate the electric generator to generate electricity.

In certain embodiments, a regenerative braking apparatus for a motor vehicle is provided. The regenerative braking apparatus includes at least one bank of springs including a plurality of springs in mechanical communication with a drive train of the motor vehicle. A coupler is configured to selectively couple and decouple each of the plurality of springs of the at least one bank of springs with the drive train. A control arrangement including a controller is operable to select predetermined ones of plurality of springs of the at least one bank of springs to the selectively coupled or decoupled with the drive train such that the predetermined ones of the plurality of springs are selectively compressed and decompressed in parallel.

In certain embodiments, each one of the plurality of springs is mechanically connected to the coupler such that they are independently compressible and decompressable from one another. In certain embodiments, the coupler includes a ratcheting mechanism adapted to incrementally compress each one of the plurality of springs in a first direction and selectively prevent decompression of each of the plurality of springs in a second direction opposite the first direction.

In certain embodiments, the at least one bank of springs includes a plurality of banks of springs. Each bank of the plurality of banks of springs incorporates a different spring type than each other one of the plurality of banks of springs.

In certain embodiments, each one of the plurality of springs has a different spring constant than each other one of the plurality of springs.

In certain embodiments, the control arrangement includes a sensor. The sensor is an electronic communication with the controller. The sensor is adapted to detect acceleration of vehicle and deceleration of the vehicle.

In certain embodiments, a regenerative braking apparatus for a motor vehicle is provided. The regenerative braking apparatus includes a plurality of springs in mechanical communication with a drive train at the motor vehicle. Each one of the plurality of springs has a predetermined spring constant. A coupler is configured to selectively couple and decouple each of the plurality of springs to the drive train. A control arrangement including a controller and a sensor is also provided. The controller is operable to select predetermined one of the plurality of springs to be coupled by the coupling means. The control arrangement operably selects the predetermined ones of the plurality of springs such that a desired result in the spring constant is obtained, the desired result of the spring constant being determined by the controller. The desired resultant in the spring constant is based upon information received from the sensor. The sensor is configured to sense an acceleration and deceleration of the motor vehicle.

In certain embodiments, the coupler is operable to compress the predetermined ones of the plurality of springs during deceleration. In certain embodiments, the coupler is operable to unlock the predetermined ones of the plurality of springs from a compressed position to decompress the predetermined ones of the plurality of springs.

In certain embodiments, a regenerative braking apparatus is provided. The regenerative braking apparatus includes a plurality of springs in mechanical communication with a drive train of the vehicle. A coupler is configured to selectively couple and decouple predetermined ones of the plurality of springs to the drive train. The coupler is also operable to couple the predetermined ones to the drive train such that the predetermined ones of the plurality of springs are compressed during a deceleration of the vehicle and decompressed during an acceleration of the vehicle. The coupler is configured to selectively maintain the predetermined ones of the plurality of springs in a compressed state. A control arrangement is also provided. The control arrangement is operable to select the predetermined ones of the plurality of springs and operate the coupler to selectively couple and decouple the predetermined ones of the plurality of springs to the drive train.

In certain embodiments, a method for storing and releasing energy generated during deceleration of a motor vehicle is provided. The method includes incrementally storing excess energy generated during braking in a storage medium. The method also includes maintaining the stored energy in the storage medium. The method further includes releasing the stored energy from the storage medium such that the stored energy is converted to at least one of mechanical energy to propel the motor vehicle or converted it to electricity to supply electrical power to the motor vehicle.

In certain embodiments, incrementally storing includes compressing a spring in a first direction a plurality of times corresponding to a plurality of braking cycles. In certain embodiments, maintaining the stored energy includes preventing decompression of the spring in second direction opposite the first direction. In certain embodiments, releasing the stored energy includes rotating a drive shaft of the motor vehicle. In certain embodiments, releasing the stored energy includes releasing the storage energy generated during a plurality of braking cycles in a single, continuous, and uninterrupted releasing operation.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the embodiments illustrated in FIGS. 1-10, a regenerative braking system will be described. It is recognized that the terms "motor vehicle" are used throughout the following description, the regenerative braking system is not limited to motorized vehicles only. Instead, the regenerative braking system can be incorporated into a variety of mechanical systems to selectively store and return surplus mechanical energy.

Figure 1:
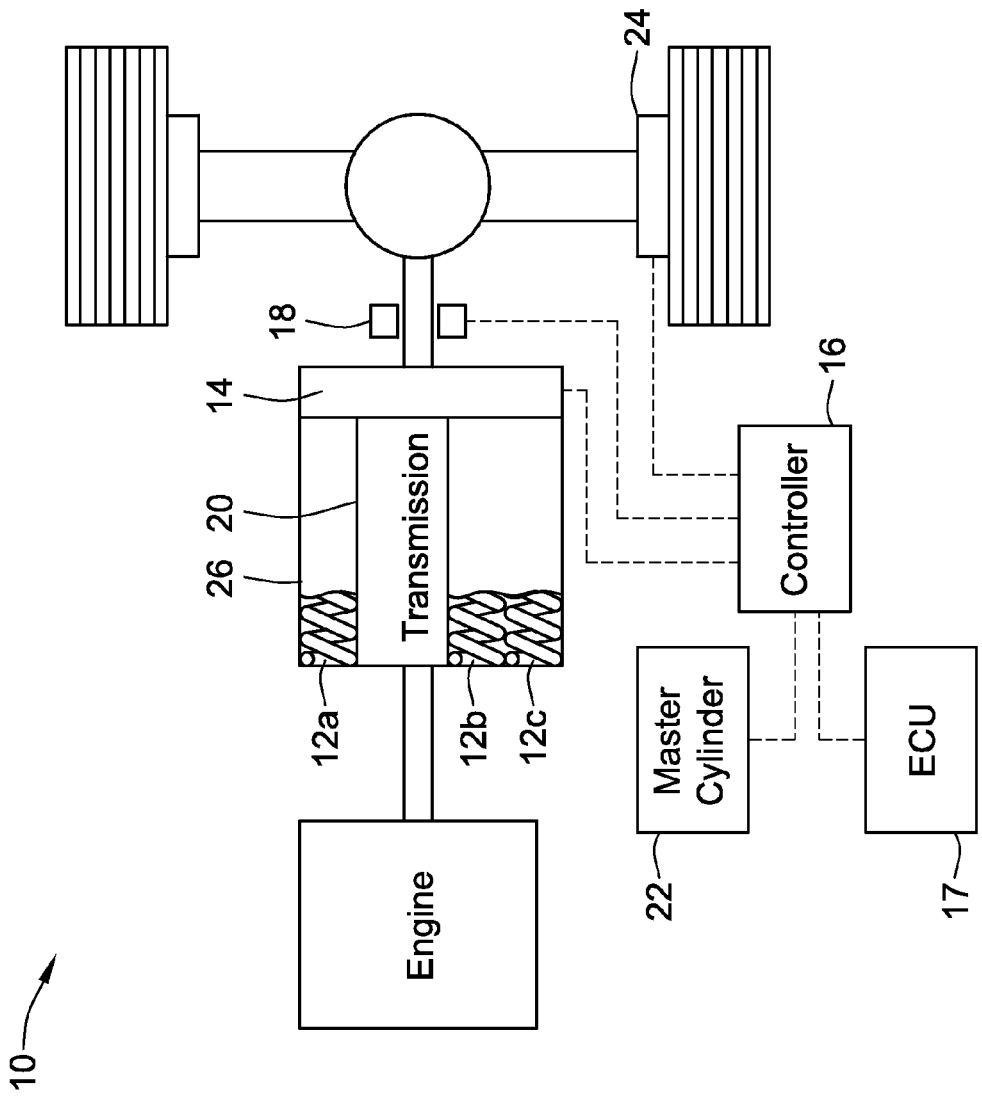
FIG. 1 is a schematic representation of an embodiment of a regenerative braking system.

With reference now to the illustrated embodiment of FIG. 1, a regenerative braking system 10 is shown. The regenerative braking system 10 includes at least one compression spring 12a-c. It will be understood that although illustrated as incorporating multiple springs 12a-c, in other embodiments, a single spring 12 can be used. It will further be understood that although illustrated schematically as a compression spring, the springs 12a-c can take the form of other types of springs, such as for non-limiting example, leaf springs, coil springs, tension springs, etc. Yet further, it will be recognized from the following that although springs 12 are illustrated as embodying a storage medium of the regenerative braking system, other storage mediums are indeed contemplated, e.g. accumulators, flywheel assemblies, etc.

A coupler 14 selectively couples and decouples each one of the springs 12a-c with a drive train of a motor vehicle. The regenerative braking system 10 further includes a control arrangement that comprises a controller 16 and a sensor 18. The sensor 18 is operably connected to the controller and to various portions of the motor vehicle. The sensor 18 collects data from the motor vehicle that the controller 16 in turn uses to determine the appropriate operation of the regenerative braking system 10. The sensor 18 may be a single sensor 18 as illustrated, or multiple.

The springs 12a-c are carried by a housing 26. As illustrated in FIG. 1, the housing 26 is generally proximate to a transmission 20 of the drive train of the motor vehicle. The springs 12a-c are in mechanical communication with the drive train and are selectively compressible to store surplus energy generated during braking of the motor vehicle. Furthermore, the springs 12a-c are selectively decompressible to release energy previously stored back into the drive train. As a result, the springs 12a-c, in combination with the remainder of the regenerative braking system 10, store and release surplus energy generated during braking to promote the more efficient use of a motor vehicle.

Indeed, the coupler 14 is operable to incrementally compress the springs 12a-c during each braking cycle of the motor vehicle. This incremental compression facilitates the "banking" or storing of small amounts of energy to later be released as a summation. As a result, this banked or stored energy can effectively be used for a variety of functions including charging a battery of the vehicle, rotating the drive shaft of the vehicle, and/or turning a motor/generator of the vehicle to propel the same (in the case of a hybrid or pure electric vehicle) or power various electrical components of the vehicle or devices such as an air conditioner compressor.

Further, the controller 16 is operable to determine when there is enough stored energy in the vehicle such that the engine may be turned off allowing the energy stored in the springs 12a-c to thereafter power various systems of the vehicle such as the air conditioning, radio, lights, etc. It is contemplated that the controller 16 may further be configured to detect when the engine is in an extended idle state, so that the controller intelligently selects when to terminate engine operation.

Furthermore, the springs 12a-c can be arranged in single banks or multiple banks of springs 12a-c. Such an embodiment can, for example, incorporate a first bank of one spring type, e.g. compression springs, and a second bank of another spring type, e.g. coil springs. Each spring 12a-c of each bank of springs are arranged in "parallel" to store and deliver energy independently of each other spring 12a-c.

Figure 4A:
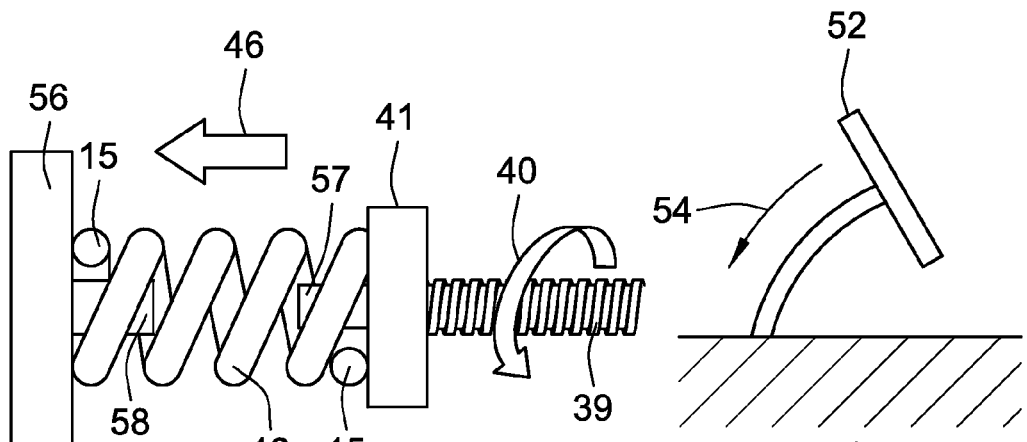
FIGS. 4A-4B present schematic illustrations of the regenerative braking system of FIG. 1 storing and releasing energy.
Figure 4B:
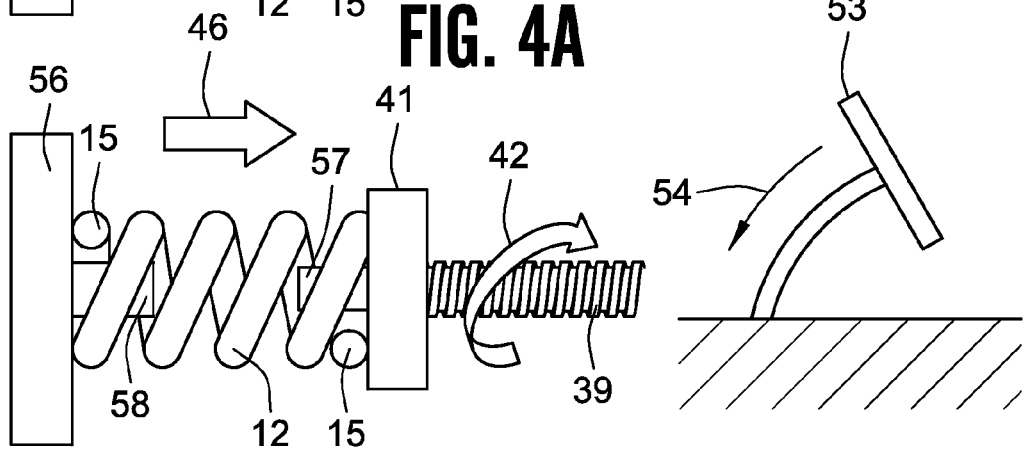

Turning now to FIGS. 4A-B a spring 12 is illustrated extending between a first end 13 and a second end 15. The spring has an inner diameter 17 (see FIG. 2), which depending upon the type of spring selected, can vary during compression and decompression of the spring 12.

Still referring to FIGS. 4A-B, the first end 13 of the spring 12 is in contact with a spring support 41 of the coupler 14. The second end 15 of the spring 12 is in contact with a stopping feature 56 of the housing 26. The spring 12 is compressible between the spring support 41 and the stopping feature 56.

The spring has an inner diameter 17 that extends between the first and second ends 13, 15 of the spring 12. The spring inner diameter 17 receives a first centering feature 57 of the spring support 41 proximate to the first end 13 of the spring 12. Similarly, the spring inner diameter 17 receives a second centering feature 58 of the stopping feature 56 proximate to the second end 15 of the spring 12. The spring 12 can rotate about the first and second centering features 57, 58 or can remain fixed relative to the first and second centering features 57, 58.

Figure 3:
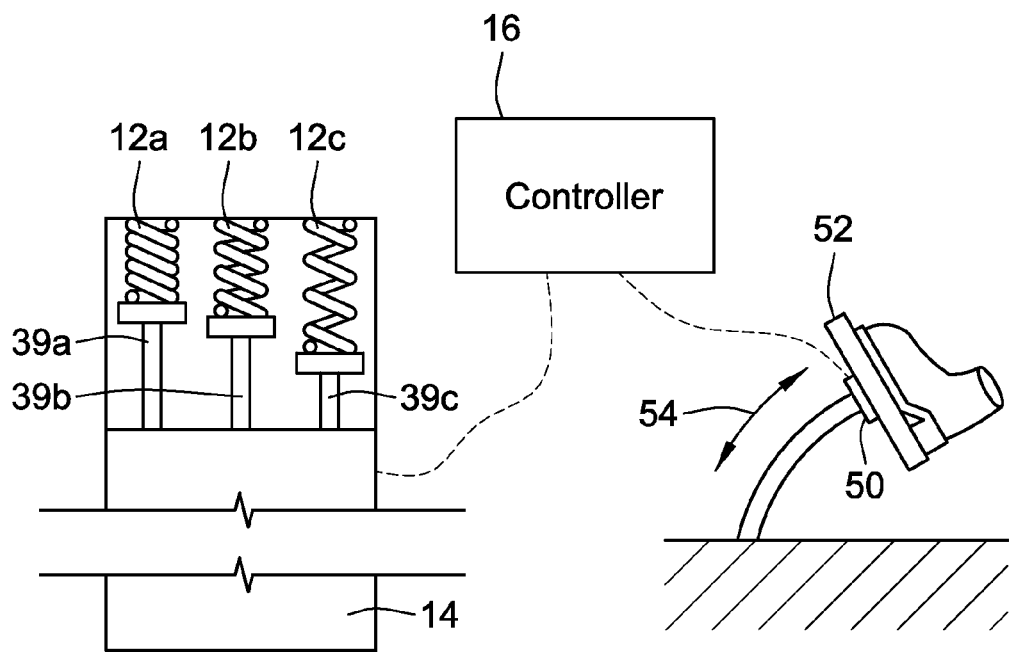
FIG. 3 is a schematic representation of the regenerative braking system of FIG. 1 incorporating a plurality of springs and a controller.

With reference now to FIG. 3, as introduced above the springs 12a-c can be "banked" or arranged in a parallel arrangement. Banking the springs 12a-c allows the regenerative braking system 10 to incorporate multiple springs 12a-c including springs having different spring constants or different types of springs entirely. As will be further discussed below, using different spring types and/or springs having different spring constants allows the regenerative braking system 10 to accommodate a broad spectrum of braking forces occurring at high speeds or very low speeds, e.g. "stop and go" traffic. The controller 16 is operable to govern the number of springs 12a-c coupled by the coupler 14 to achieve a desired resultant spring constant in order to further optimize the amount of energy stored by the regenerative braking system 10.

In one embodiment, the regenerative braking system 10 can incorporate multiple different types of springs in a single bank. For example, a single bank can include a compression spring, a leaf spring, and a coil spring or other non-spring type storage mediums. By incorporating multiple different types of storage mediums, a single bank can store and release a broad spectrum of quantities of energy. However, it will be understood that even a bank incorporating a plurality of the same type of springs or other storage mediums can nonetheless also store and release a broad spectrum of quantities of energy.

As discussed above, different types of springs, e.g. coil, conical, cone, straight, torsion, etc., can be incorporated with the regenerative braking system 10. For example, certain types of springs, and/or other storage mediums conical springs, possess a variable spring constant. In certain embodiments, the regenerative braking system 10 can incorporate springs having a variable spring constant to accommodate braking forces that vary over time. For example, it is not uncommon for the braking force applied to increase in a nonlinear fashion from the beginning to the end of the braking cycle. Accordingly, a spring with a variable spring constant is ideal for matching the varying braking force with a corresponding optimized spring constant in order to ultimately optimize the amount of energy stored by the regenerative braking system 10.

Figure 2:
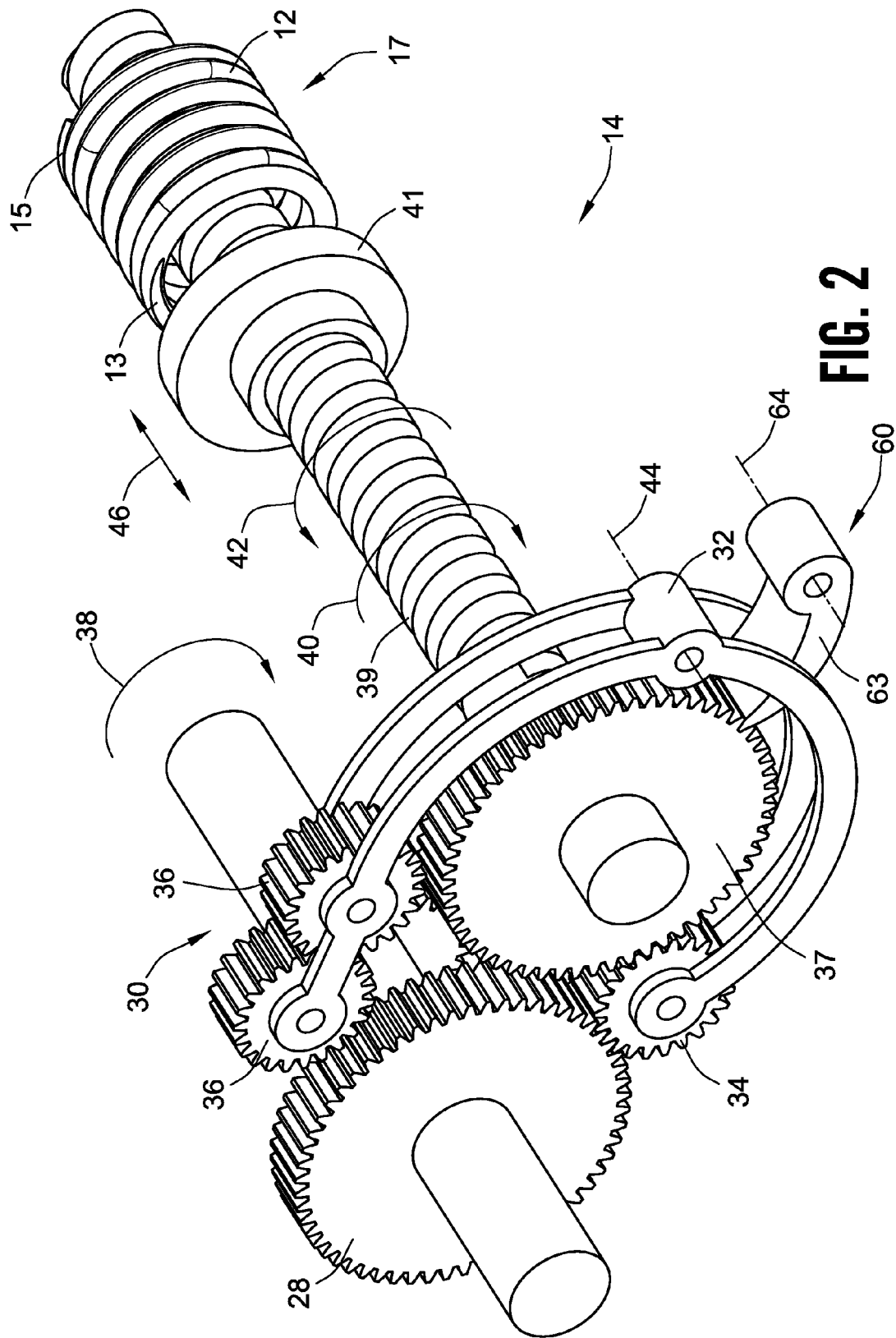
FIG. 2 is a coupler of the regenerative braking system of FIG. 1.

With reference now to FIG. 2, an embodiment of a coupler 14 is illustrated. The coupler 14 includes a selector arm 32 that carries input gearing 34 and output gearing 36. The coupler 14 further includes a lead screw 39 operably connected to a lead gear 37 affixed to an end of the lead screw 39. The coupler 14 further includes a pawl mechanism 60 for selectively maintaining the lead screw 39 and lead gear 37 in a fixed orientation. It is recognized that the coupler 14 is described above is only one example of a coupler 14. Other mechanical systems are contemplated to selectively couple and decouple the springs 12a-c. For example, in other embodiments, the coupler 14 can be a pulley system, a clutch system, a continuously variable transmission system, etc.

The selector arm mechanically couples the lead gear 37 with a drive gear 28 of the drive train of a motor vehicle. The drive gear 28 is selectively interlockable with the drive shaft such that the shaft 30 rotates independently of drive gear 28, or the shaft 30 and drive gear 28 rotate in unison. As will be discussed in greater detail below, the controller (see FIG. 2) governs the rotational relationship between the drive gear 28 and the drive shaft 30. The drive gear 28 is selectively interlockable with the shaft using various mechanisms, e.g. a frictional clutch mechanism. Although illustrated in FIG. 2 as incorporating a single spring 12, it will be understood from the following description that multiple springs 12a-c can be coupled to a drive train of a motor vehicle using multiple interconnected couplers 14 as illustrated in FIG. 3.

A drive shaft 30 is illustrated in FIG. 2. The drive shaft 30 rotates along a direction 38 to supply a torque to the remainder of the drive train and ultimately transmit power to the wheels of the motor vehicle. To transfer energy from the drive shaft 30 to the regenerative braking system 10, the selector arm 32 rotates about an axis 44 such that the input gearing 34 carried by the selector arm 32 is in mechanical communication between the drive gear 28 and the lead gear 37 of the lead screw 39.

The controller then initiates the coupling of the drive gear 28 to the drive shaft 30 such that both components thereafter rotate in unison. When the drive gear 28 is coupled to the lead gear 37 via the input gearing 34, the lead gear 27 and the lead screw rotates in a direction 40 such that the spring support 41 moves in a linear direction 46 to ultimately compress the spring 12. As a result, energy is transferred from the drive shaft 30 to the spring 12 by the compression thereof. As a further result, less frictional force is required to provide the desired braking force called upon by the motor vehicle operator to stop the vehicle. Put differently, the excess braking energy is transferred to the coupler 14 to compress the spring 12.

As the lead gear 37 rotates a pawl 62 of the pawl mechanism 60 follows the lead gear 37 in such a way that the lead gear 37 is free to rotate in one direction 40. However, the pawl 62 does not allow the lead gear 37 to rotate in an opposite direction 42 thereby locking the lead gear 37 in a ratcheting type fashion. As a result, the energy stored by the compression of the spring 12 remains stored until the pawl mechanism 60 moves to an unlocked position.

Where energy stored by the spring 12 is to be returned to the drive shaft 30 to rotate the drive shaft 30 in the driving direction 38, a reverse process to that of the above is followed. First, the selector arm 32 rotates about axis 44 such that the output gearing 36 is then mechanically coupled between the drive gear 28 and the lead gear 37. The pawl mechanism 60 then rotates about a locking axis 64 such that the lead gear 37 and drive screw 39 can rotate in a direction 42 such that support plate 41 moves along a linear direction 46 toward the lead gear 37. As a result, rotational energy is then resupplied to the drive shaft 30 to rotate the drive shaft 30 in the driving direction 38 during an initial acceleration. As a vehicle initially accelerates from a zero velocity, less energy from the combustion of fuel, or electricity in the case of an electric car, is required to rotate the drive shaft 30 due to the input of stored energy from the spring 12. Further, the coupler 14 may be mechanically connected to a generator to also power the various electrical systems of the vehicle, and/or charge the vehicle battery.

Figure 9:
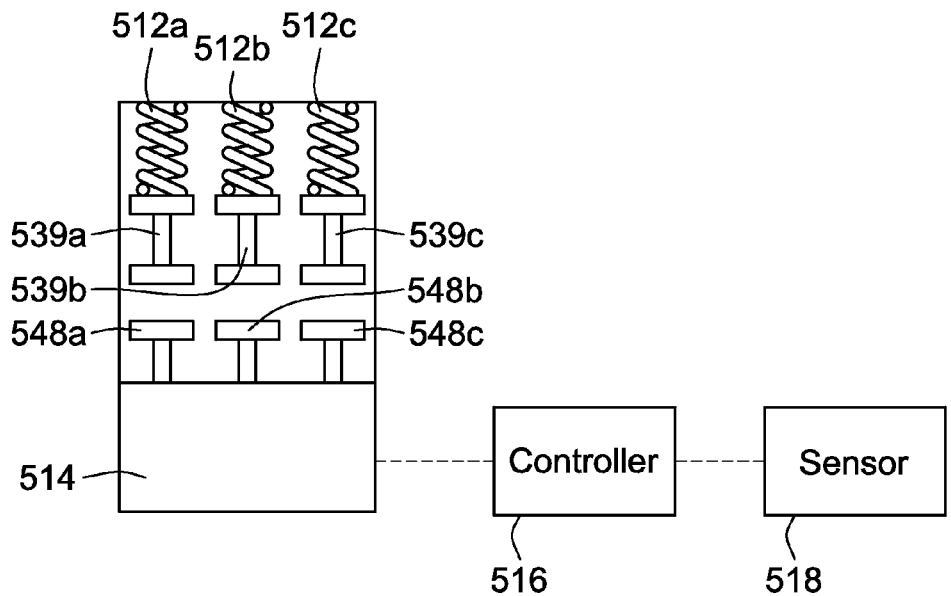
FIG. 9 is a schematic representation of a fifth embodiment of a regenerative braking system.

With reference now to FIG. 9, an alternative embodiment of a coupler 514 is illustrated. In the illustrated embodiment, coupler 514 incorporates a plurality of clutches 548a-c each linearly moveable to selectively engage a plurality of lead screws 539a-c to ultimately compress springs 512a-c. The coupler 514 of FIG. 9 is operably connected to a controller 516 that receives an input signal from a sensor 518. The controller 516, based upon the input signal received by the sensor 518, is operable to determine which ones of the clutches 548a-c are engaged to compress springs 512a-c.

The controller 516 makes this determination based upon the desired energy to be stored at a given deceleration and desired energy to be returned at a given acceleration. The coupler 514 can also include a continuously variable transmission mechanically disposed between the coupler 514 and the drive train of the motor vehicle to further optimize the amount of energy stored and returned to the drive train. The controller 516 controls the selected gearing ratio supplied by the continuously variable transmission as well as the operation of the coupler 514 as discussed above.

Referring back to FIG. 2, in certain circumstances, it is desirable to rely solely on the frictional force applied by a conventional braking system as opposed to the braking capabilities of the regenerative braking system 10. Accordingly, the selector arm 32 also has a neutral position such that neither the input gearing 34 nor the output gearing 36 is coupled between the drive gear 28 and the lead gear 37. As a result, the coupler 14 remains unconnected to the drive train such that the conventional braking system of the vehicle is employed. Such functionality is desirable where rapid braking is required, e.g. emergency braking scenarios.

The positioning of the selector arm 32 about the coupling axis 44 and the positioning of the pawl mechanism 60 about the locking axis 64 are governed by the control arrangement, and more particularly, the controller 16 of the control arrangement as illustrated for example in FIGS. 1 and 3. As will be discussed in greater detail below, the sensor 18 of the control arrangement gathers information relating to the relative acceleration and deceleration of the vehicle. This information is used by the controller 16 to govern the position of the selector arm 32 (FIG. 2) and the pawl mechanism 60 to ultimately set up the energy storage or energy return functionality as discussed above.

Referring back to FIG. 3, in one embodiment, the controller 16 is in electronic communication between the coupler 14 and a sensor, such as an accelerometer 50, affixed to each of the brake pedal 52 and gas pedal 53 (FIG. 4B) of the motor vehicle. As either the brake or gas pedal 52, 53 is depressed along an angular direction 54, the accelerometer 50 is likewise accelerated in the angular direction 54 towards the interior floor of the motor vehicle. The controller 16 receives the input signal from the accelerometer 50 and thereafter determines a select number of the springs 12a-c to compress using the lead screws 39a-c as illustrated in FIG. 3. Further, the controller 16 can communicate with sensors disposed in the master cylinder 22 of the motor vehicle as shown at FIG. 1.

With reference now to FIG. 4A, as the brake pedal 52 is depressed along an arcuate path 54 towards the interior floor of the motor vehicle, the controller 16 is operable to rotate the selector arm 32 such that the input gearing 34 is in mechanical communication between the drive gear 28 and the lead gear 37 by rotating the selector arm 32 in the appropriate direction about an axis 44 using, for example, a servo motor. In the event a coupler 14 as illustrated in FIG. 2 is utilized, the lead screw 39 will rotate in a direction 40 such that the support plate 41 moves along a linear direction 46 to compress the spring 12 as discussed above. It will be recognized that in embodiments incorporating the lead screw type design for the coupler 14, the first and second centering features 57 and 58 illustrated in FIG. 4A are joined and form a continuous threaded portion of the lead screw 39.

With reference now to FIG. 4B, as the gas pedal 53 is depressed along an arcuate path 54 towards the interior floor of the motor vehicle, the controller 16 of the control arrangement rotates the selector arm 32 in a direction such that the output gearing 36 is thereafter coupled between the drive gear 28 and the lead gear 37. The controller 16 is also operable to rotate the pawl mechanism 60 about the locking axis 64 such that the pawl 62 is out of engagement with the lead gear 37. The controller 16 accomplishes this functionality using, for example, a servo motor operably connected to the pawl mechanism 60. As a result, the spring 12 is allowed to decompress in a linear direction 46 such that the support plate 41 also moves along a linear direction 46 and the lead screw 39 rotates about an angular direction 42 to ultimately return energy to the drive shaft 30 of the motor vehicle, thereby requiring less energy from combustion to propel the vehicle.

Figure 8:
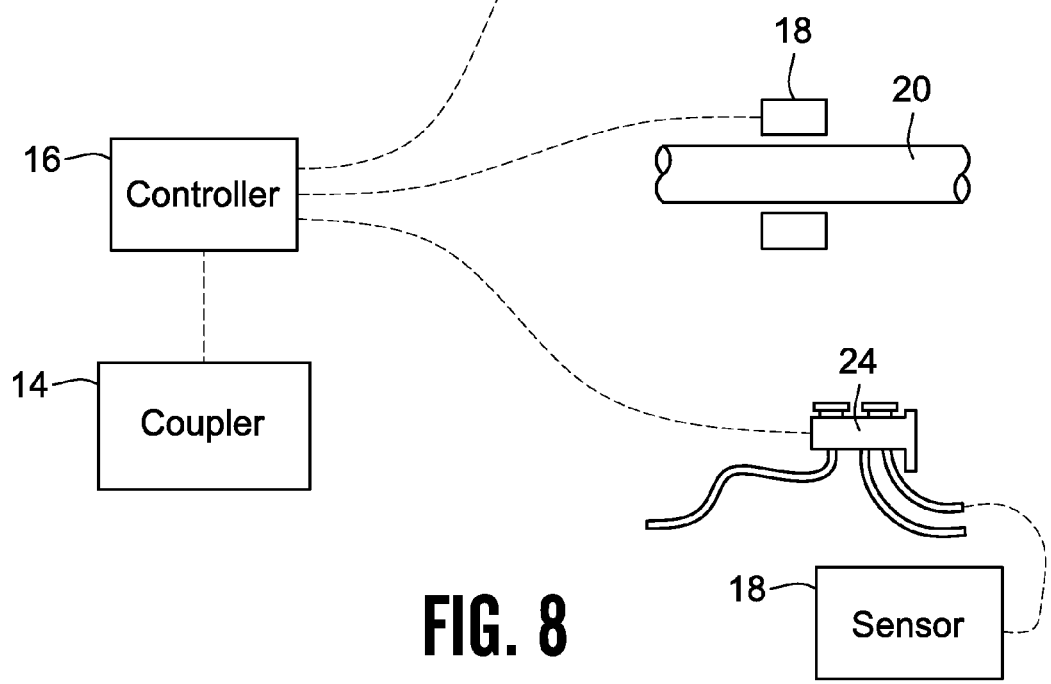
FIG. 8 is a schematic representation of a control arrangement of the regenerative braking system of FIGS. 1, 5, 6, and 7.

Referring now to FIG. 8, the controller 16 of the control arrangement can receive a variety of inputs that relate to the relative acceleration and deceleration of the motor vehicle. For example, the controller can receive an input from a pressure sensor operably connected to a master cylinder 22 of the braking system and determine which, if any, springs 12a-c should be selectively coupled or decoupled to the drive train. In another embodiment, the controller 16 can incorporate a rotational sensor 18 that monitors the rotation of the drive shaft 30 (see FIG. 2). As yet another alternative, the sensor can monitor a frictional force applied by the braking system. For example, the controller 16 can monitor the frictional force detected by a sensor 18 operably connected to the conventional braking system 24 of the vehicle (see FIG. 1).

It will be recognized that controller 16 is not limited to a single input from a single sensor 18, but instead, can receive multiple inputs from multiple sensors 18. The controller 16 is operable to determine the appropriate springs 12a-c to selectively couple or decouple using the coupler 14 based upon these inputs. It will be further recognized that the controller 16 can collect various types of information, e.g. acceleration, drive shaft rotation, throttle positioning, brake pad compression, etc., can be collected by various types of sensors, e.g. accelerometers, light sensors, rotation sensors, strain gauges, load sensors, etc., to control the remainder of the regenerative braking system.

The controller 16 uses these inputs to select the appropriate spring or springs 12a-c to couple to the drive train to accommodate light braking and heavy braking. Likewise, the controller 16 also uses these inputs to select the appropriate spring or springs 12a-c to couple to the drive train to accommodate light accelerations and heavy accelerations. As a result, the regenerative braking system 10 can function to store and release energy when a motor vehicle operates on an open road as well as when in congested high traffic areas. In embodiments incorporating multiple springs 12a-c, or a single spring, the controller 16 is operable to calculate a resultant spring constant to efficiently match a braking requirement of the vehicle as detected by the sensor. Further, the controller 16 is operable to calculate a resultant spring constant of the compressed spring or springs to efficiently match on acceleration requirement of the vehicle.

In one embodiment, the controller 16 can operably connect directly to a motor vehicles electronic control unit (ECU) 17 (see FIG. 1). In such an embodiment, the controller 16 can utilize the existing sensors and data collection systems of a motor vehicle to operate the remainder of the regenerative braking system 10. This functionality allows for the more cost effective retrofit of a regenerative braking system 10 by utilizing existing sensor systems of the motor vehicle.

Additionally, load sensors, e.g. strain gauges, can be affixed to the springs 12a-c and operably connected to the controller 16. The controller 16 can use information received from the load sensors to monitor the current amount of energy stored in a given spring 12a-c, and under what accelerations a particular spring 12a-c should be coupled to the drive train to return energy thereto.

Figure 5:
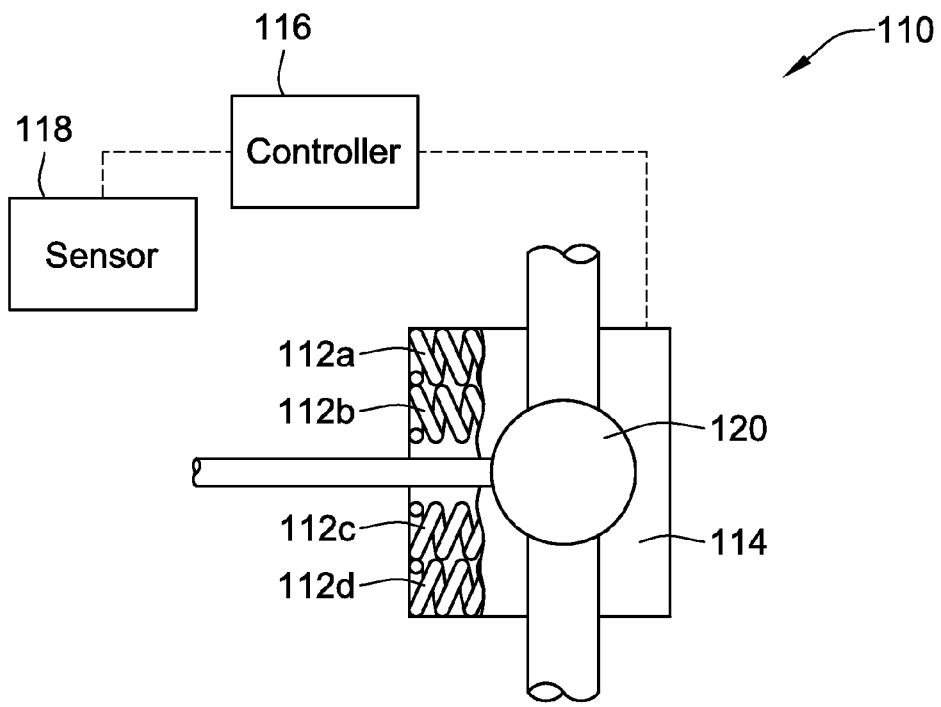
FIG. 5 is a schematic representation of a second embodiment of a regenerative braking system.

Turning now to FIG. 5 an alternative embodiment of a regenerative braking system 110 is illustrated. The regenerative braking system 110 includes at least one compression spring 112a-d and a coupling means 114 operable to selectively couple and decouple the at least one spring from a differential 120 of the motor vehicle. In a similar manner as discussed above, a controller 116 is operable to select predetermined ones of the at least one spring 112a-d to be coupled and decoupled with the differential 120 such that a resultant spring constant is obtained and an optimal amount of energy is either stored or released from or to the differential 120 respectively.

The controller 116 receives a signal for a sensor 118, and based upon the signal, determines the appropriate spring or springs to be selectively coupled by the coupler 114. The sensor 118 can take the form of various conventional sensors and be attached to various components of the motor vehicle similar to that as illustrated in FIG. 8.

Figure 6:
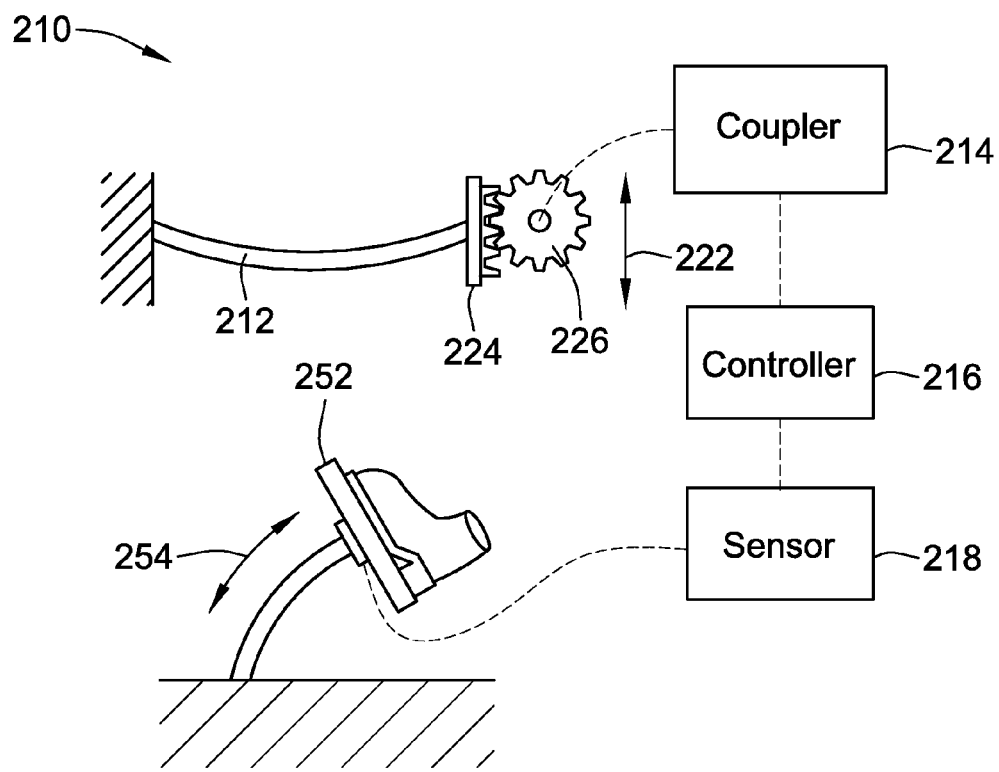
FIG. 6 is a schematic representation of a third embodiment of a regenerative braking system.

Turning now to FIG. 6, another embodiment of a regenerative braking system 210. In this embodiment, at least one leaf spring 212 is in mechanical communication with a drive train of the motor vehicle. A coupler 214 selectively couples and decouples the leaf spring 212 with the drive train of the motor vehicle to store energy by deflecting the leaf spring 212 and release energy by allowing the leaf spring 212 to return to an undeflected position. As illustrated in FIG. 6, the leaf spring 212 maintains mechanical communication with the coupler 214 by way of a rack and pinion assembly illustrated as rack 224 and pinion 226. The rack 224 is linearly moveable relative to the pinion 226 along a linear direction 222. The pinion 226 thereby converts the linear motion of the rack 224 caused by the leaf spring 212 into rotational energy to thereafter be transferred to or from the coupler 214.

A controller 216 is operable to receive an input from a sensor 218 relating to the acceleration or deceleration of the motor vehicle. The controller 216 thereafter initiates the coupling or decoupling functionality of coupler 214 to selectively store and release energy from the leaf spring 212 respectively. In one embodiment, the sensor 218 can be an accelerometer coupled to the brake pedal 252 and/or gas pedal (not shown). The accelerometer 218 is operable to sense movement of either pedal along a direction 254 towards the interior floor of the motor vehicle. The controller 216 receives this information from the accelerometer 218 and makes a determination regarding what amount, if any, of leaf springs 212 to couple using the coupler 214 in order to store or release energy respectively. The sensor 218 can take a variety of forms and be attached to a variety of components of the motor vehicle, similar to that discussed above and with reference to FIG. 8.

Figure 7:
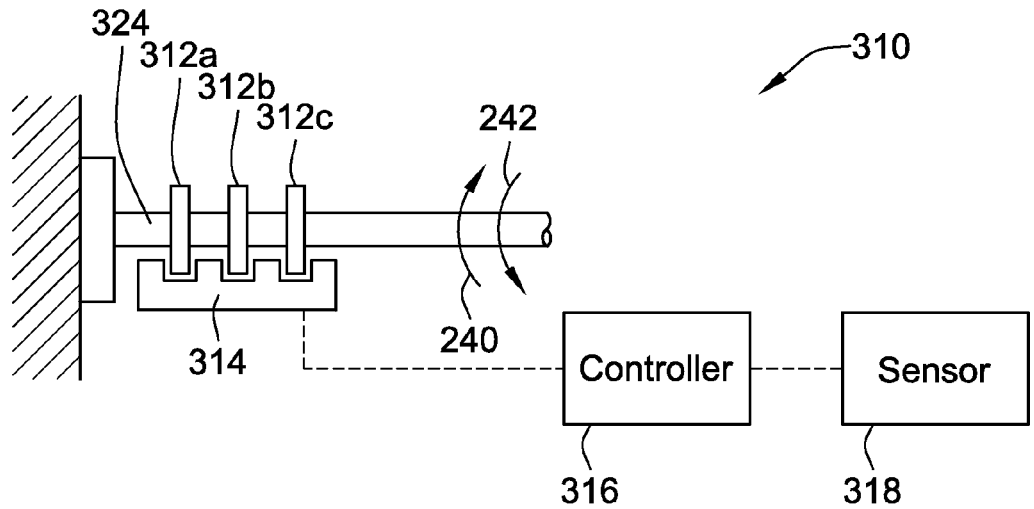
FIG. 7 is a schematic representation of a fourth embodiment of a regenerative braking system.

With reference now to FIG. 7, another embodiment of a regenerative braking system 310 is illustrated. In this embodiment, the regenerative braking system 310 incorporates at least one coil spring 312a-c mounted at one end to a shaft 324. Although illustrated as incorporating multiple springs 312a-c, it is recognized that a single spring could also be utilized to achieve the contemplated advantages discussed herein. A coupler 314 is operable to selectively couple and decouple each of the coil springs 312a-c with the drive train of a motor vehicle. More particularly, the coupler 314 is operable to transfer rotational energy stored by the at least one coil spring 312a-c when the coil springs are coiled in a first direction 240 through rotation of the shaft 324. The coupler 314 is also operable to transfer energy store by the at least one spring 312a-c back to the drive train by uncoiling the at least one coil spring 312a-c about a second direction 242.

The coupler 314 includes a coupling block 322. The coupling block 322 is operable to selectively prevent the rotation of the coil spring 312a-c relative to the shaft 324 that each of the coil springs 312a-c are mounted upon. The coupling block 322 is operable to selectively engage and disengage the coil springs 312a-c to the output shaft 324 such that the springs remain fixed relative to the rotation of the shaft 324. When this is so, the springs are wound about the shaft and store energy thereafter. The coupling block 322 is also operable to maintain the springs 312a-c in a fixed position so that energy may be later returned to the drive train as described above.

A controller 316 is operable to control the coupler 314, and more particularly the coupling block 322, to selectively couple and decouple predetermined ones of the coil springs 312a-c. The controller 316 receives an input from a sensor 318. The sensor 318 can take the form of various types of sensors to monitor various data relating to the braking force required to stop the motor vehicle or the amount of acceleration required to accelerate the motor vehicle.

Figure 10:
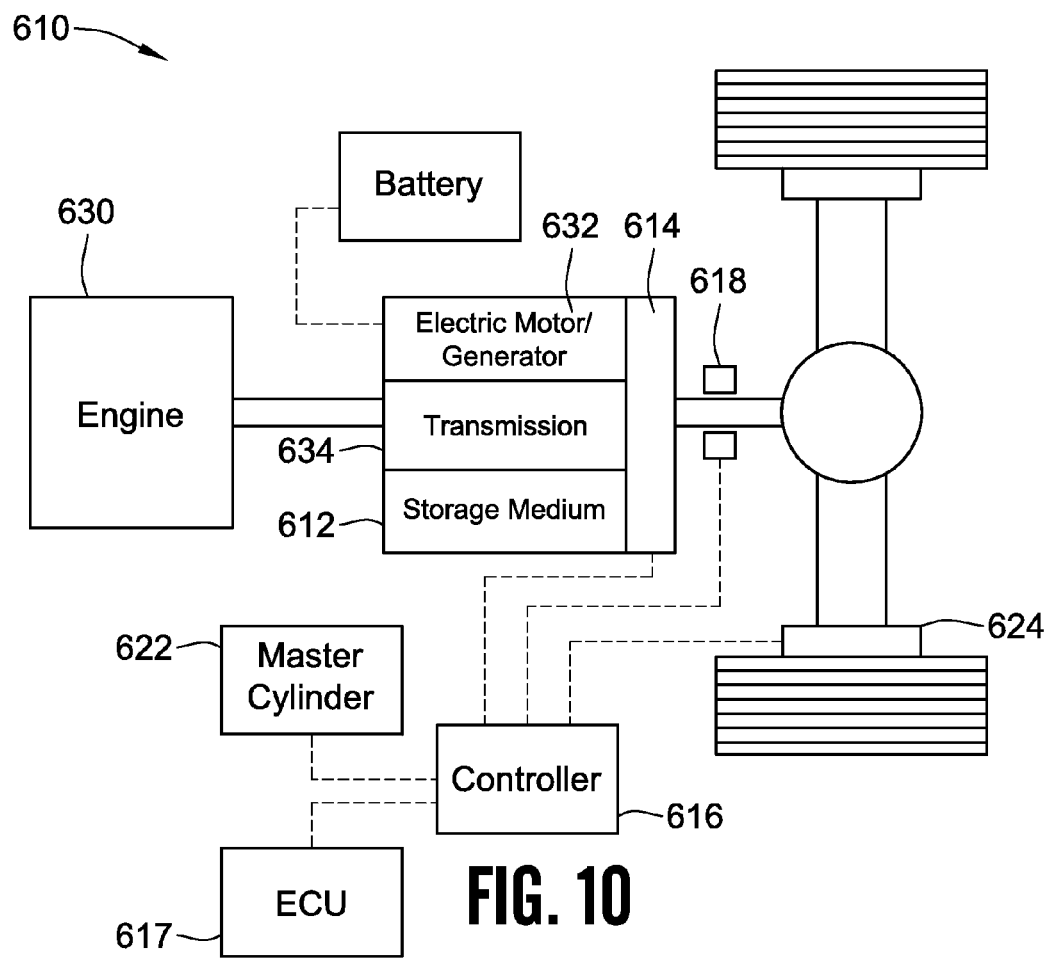
FIG. 10 is a schematic representation of a sixth embodiment of a regenerative braking system.

Turning now to FIG. 10 another embodiment of a regenerative braking system 610 is illustrated. In this embodiment, the regenerative braking system 610 is incorporated into a hybrid or electric motor vehicle. Although schematically illustrated as incorporating an engine 630 and an electric motor 632 typical to a design of a conventional hybrid vehicle, it will be recognized that the regenerative braking system 610 of the illustrated embodiment can be incorporated into a purely electric motor vehicle, a hybrid fuel/electric, or a conventional internal combustion engine. In this embodiment, a storage medium 612, which may be a spring or bank of springs as described above, is selectively coupled and decoupled with either the drive train 634 or the electric motor generator 632 of the hybrid vehicle or a combination of both. The coupler 614 functions to selectively couple and decouple the energy storage medium 612 to store energy generated during braking and release that stored energy thereafter to either the drive train of the motor vehicle or the electric motor generator 632, or a combination of both. The coupler 614 is operably connected to a controller 616. The controller 616 is configured to receive a variety of inputs from sensor 617, 618, 622, 624 relating to the acceleration and deceleration of the motor vehicle. The controller 616 uses these inputs to thereafter govern the operation of the coupler 614.

In addition, since modern hybrid and hybrid fuel/electric vehicles traditionally use smaller internal combustion engines, using the braking energy to charge the batteries efficiently will allow certain subsystems such as the air conditioning compressor to be driven directly using one of the vehicles electrical motors. As a result, embodiments of the invention allow for an even further reduction in the size of internal combustion engines used in these modern vehicles.

In the illustrated embodiment of FIG. 10, the storage medium 612 can take a variety of forms. For limiting example, the storage medium 612 can be a spring, hydraulic accumulator, pneumatic system, or other energy storage system. Additionally, the storage medium 612 can be in a banked configuration as discussed above so that multiple energy storage elements of the storage medium 612 are utilized.

The coupler 614 can take the form of the coupler 14 illustrated in FIG. 2 but is not limited so. Indeed, the coupler 614 can take a variety of forms sufficient to transfer the mechanical energy from the vehicle to the storage medium and to transfer the mechanical energy from the storage medium to the vehicle.

Once energy is stored in the storage medium 612, it can then be returned to the drive train of the motor vehicle as discussed above, or to the electric generator/motor of the electric power plant of the hybrid motor vehicle. This allows energy stored during braking to be used to not only accelerate the vehicle during a later acceleration, but also to charge a battery powering the electric motor as schematically illustrated in FIG. 10. Moreover, the coupler 614 can simultaneously input energy back into the drive train of the hybrid motor vehicle while also supply mechanical energy to a generator of the electric power plant of the hybrid motor vehicle. As a result, energy can be stored in the storage medium 612 during normal operation of the vehicle and then used to recharge the battery of the hybrid electric motor vehicle during periods of non-operation, e.g. overnight; or when another storage medium is engaged for braking while the compressed storage medium is used to charge the battery while in motion.

It will be recognized that by accumulating energy via the storage medium 612 and thereafter resupplying that energy to the battery of the hybrid electric motor vehicle in a single prolonged and constant charging operation preserves the life of the electrical system of the hybrid motor vehicle. More particularly by storing energy in the storage medium 612, the energy can be transferred back into electrical energy of the battery in a single operation thereby not necessitating rapid cycling through charging states. Further, where multiple electric motor/generators 632 are utilized, one generator 632 can receive energy from the storage medium 612, and deliver electrical power to another electrical motor generator 632. It will be recognized that although the electric motor/generator is schematically shown adjacent to the storage medium 612, it may be located anywhere on the vehicle, including on the axle driving the illustrated wheels.

The controller 616 functions in a similar manner as that discussed above. More particularly, the controller 616 is operable to receive various inputs from the hybrid motor vehicle relating to the relative acceleration and deceleration thereof. The controller 616 can thereafter signal the coupler 614 to selectively couple or decouple the storage medium 612 to store or release energy.

The controller 616 can receive inputs from a variety of sources. For example, the controller 616 can monitor a signal received from a rotational sensor 618 sensing the rotation of a drive shaft of the hybrid motor vehicle. For another example, the controller 616 can receive an input from a pressure sensor operably connected to a master cylinder 622 of the braking system of the hybrid electric motor vehicle. As yet another example, the controller 616 can receive an input from a sensor operably connected to a brake 624 of a conventional braking system of the hybrid electric motor vehicle. It will be recognized that the sources of input discussed above are not mutually exclusive of one another. Instead, the controller 616 can receive a variety of simultaneous inputs to thereafter make a determination of whether or not to selectively couple or decouple the storage medium 612 using the coupler 614.

As described herein, the regenerative braking system promotes the more efficient use of either a conventional motor vehicle, hybrid motor vehicle, or purely electrically powered vehicle. The regenerative braking system does this in an optimized manner by incorporating various energy storage mediums and using a controller to determine the most efficient amount, if any, of the storage mediums to store and release energy. Further, the above-described embodiments advantageously and substantially reduce the need to charge the batteries of a hybrid or purely electric vehicle from an external source, as charging can be effectuated by the regenerative braking system.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A regenerative braking apparatus for a motor vehicle, comprising:
   at least one spring in mechanical communication with a drive train of the motor vehicle;
   a coupler configured to selectively couple and decouple the at least one spring with the drive train; and
   a control arrangement including a controller and a sensor for sensing an acceleration and a deceleration of the motor vehicle, and the controller operable to operate the coupler such that the at least one spring is compressed by the coupler when the sensor senses the deceleration and the at least one spring is decompressed when the sensor senses the acceleration.

2. The apparatus of claim 1, wherein the coupler moves in a first direction to compress the at least one spring, and a second direction opposite the first direction when the at least one spring is decompressed, and wherein the coupler is mechanically coupled between the at least one spring and a drive shaft of the drive train such that movement of the coupler in the second direction results in rotation of the drive shaft by the coupler.

3. The apparatus of claim 2, wherein the coupler is mechanically coupled between the at least one spring and the drive train, and between an electric generator, wherein movement of the coupler in the second direction results in rotation of the electric generator to generate electricity and a rotation of the drive shaft.

4. The apparatus of claim 2, wherein the at least one spring includes a plurality of springs independently compressible and decompressible from one another by the coupler, wherein the control arrangement is operable select predetermined ones of the plurality of springs to match a braking requirement, and wherein the coupler is operable to simultaneously compress the predetermined ones of the plurality of springs.

5. The apparatus of claim 4, wherein the control arrangement is operable to select predetermined compressed ones of the plurality of springs based on an acceleration requirement, and wherein the coupler is operable to unlock the predetermined compressed ones of the plurality of springs to mechanically transfer energy to the drive shaft.

6. A regenerative braking apparatus for a motor vehicle, comprising:
   at least one bank of springs including a plurality of springs in mechanical communication with a drive train of the motor vehicle;
   a coupler for selectively coupling and decoupling each of the plurality of springs of the at least one bank of springs with the drive train; and
   a control arrangement including a controller operable to select predetermined ones of the plurality of springs of the at least one bank of springs to be selectively coupled or decoupled with the drive train such that the predetermined ones of the plurality of springs are selectively compressed and decompressed in parallel.

7. The apparatus of claim 6, wherein each one of the plurality of springs is mechanically connected to the coupler such that they are independently compressible and decompressible from one another.

8. The apparatus of claim 7, wherein the coupler includes a ratcheting mechanism adapted to incrementally compress each one of the plurality of springs in a first direction and selectively prevent decompression of each one of the plurality of springs in a second direction opposite the first direction.

9. The apparatus of claim 6, wherein the at least one bank of springs includes a plurality of banks of springs, wherein each bank of the plurality of banks of springs incorporates a different spring type than each other one of the plurality of banks of springs.

10. The apparatus of claim 6, wherein each one of the plurality of springs has a different spring constant than each other one of the plurality of springs.

11. The apparatus of claim 6, wherein the control arrangement includes a sensor in electronic communication with the controller, the sensor adapted to detect acceleration of the vehicle and deceleration of the vehicle.

12. A regenerative braking apparatus for a motor vehicle, comprising:
    a plurality of springs in mechanical communication with a drive train of the motor vehicle, wherein each of the plurality of springs has a predetermined spring constant;

a coupler configured to selectively couple and decouple each of the plurality of springs to the drive train; and a control arrangement including a controller and a sensor, the controller operable to select predetermined ones of the plurality of springs to be coupled by the coupling means, wherein the control arrangement operably selects the predetermined ones of the plurality of springs such that a desired resultant spring constant is obtained, the desired resultant spring constant being determined by the controller and based upon a signal received from the sensor, wherein the sensor senses an acceleration and a deceleration of the motor vehicle.

13. The apparatus of claim 12, wherein the coupler is operable to compress the predetermined ones of the plurality of springs during deceleration.

14. The apparatus of claim 13, wherein the coupler is operable to unlock the predetermined ones of the plurality of springs from a compressed position to decompress the predetermined ones of the plurality of springs.

15. A regenerative braking apparatus, comprising:
a plurality of springs in mechanical communication with a drive train of the vehicle;
a coupler configured to selectively couple and decouple predetermined ones of the plurality of springs to the drive train, the coupler operable to couple the predetermined ones to the drive train such that the predetermined ones of the plurality of springs are compressed during a deceleration of the vehicle and decompressed during an acceleration of the vehicle, wherein the coupler selectively maintains the predetermined ones of the plurality of springs in a compressed state; and
a control arrangement operable to select the predetermined ones of the plurality of springs and operate the coupler to selectively couple and decouple the predetermined ones of plurality of springs to the drive train.

16. A method for storing and releasing energy generated during deceleration of a motor vehicle, the method comprising:
incrementally storing excess energy generated during braking in a storage medium;
maintaining the stored energy in the storage medium; and
releasing the stored energy from the storage medium such that the stored energy is converted to at least one of mechanical energy to propel the motor vehicle or converted to electricity to supply electrical power to the motor vehicle.

17. The method of claim 16, wherein incrementally storing includes compressing a spring in a first direction a plurality of times corresponding to a plurality of braking cycles.

18. The method of claim 17, wherein maintaining includes preventing decompression of the spring in a second direction opposite the first direction.

19. The method of claim 18, wherein releasing the stored energy includes rotating a drive shaft of the motor vehicle.

* * * * *